US009046362B2

(12) United States Patent
Westermark et al.

(10) Patent No.: US 9,046,362 B2
(45) Date of Patent: Jun. 2, 2015

(54) METHOD FOR A MEASURING INSTRUMENT

(75) Inventors: Magnus Westermark, Ekerö (SE); Mikael Hertzman, Sollentuna (SE)

(73) Assignee: Trimble AB, Danderyd (SE)

( * ) Notice: Subject to any disclaimer, the term of this patent is extended or adjusted under 35 U.S.C. 154(b) by 412 days.

(21) Appl. No.: 13/578,457

(22) PCT Filed: Feb. 11, 2010

(86) PCT No.: PCT/EP2010/051711
§ 371 (c)(1), (2), (4) Date: Sep. 6, 2012

(87) PCT Pub. No.: WO2011/098127
PCT Pub. Date: Aug. 18, 2011

(65) Prior Publication Data
US 2012/0326709 A1 Dec. 27, 2012

(51) Int. Cl.
*G01C 25/00* (2006.01)
*G01C 5/00* (2006.01)
*G01C 15/00* (2006.01)

(52) U.S. Cl.
CPC .............. *G01C 15/002* (2013.01); *G01C 25/00* (2013.01)

(58) Field of Classification Search
CPC ........................................................ G01C 25/00
USPC ................................ 33/290; 73/1.79; 702/151
See application file for complete search history.

(56) References Cited

U.S. PATENT DOCUMENTS

| 6,138,367 | A | 10/2000 | Raby |
| 6,243,658 | B1 | 6/2001 | Raby |
| 7,793,424 | B2 * | 9/2010 | Laabs et al. ..................... 33/290 |
| 8,321,167 | B2 * | 11/2012 | Haijima et al. ................. 702/94 |
| 2006/0191148 | A1 * | 8/2006 | Lippuner ........................ 33/290 |
| 2007/0180716 | A1 * | 8/2007 | Hertzman ....................... 33/290 |
| 2011/0023578 | A1 * | 2/2011 | Grasser ......................... 73/1.75 |

FOREIGN PATENT DOCUMENTS

WO WO-2004057269 A1 7/2004

OTHER PUBLICATIONS

International Search Report PCT/ISA/210 for International Application No. PCT/EP2010/051711 dated Nov. 5, 2010.

* cited by examiner

Primary Examiner — Christopher Fulton
(74) Attorney, Agent, or Firm — Harness, Dickey & Pierce, P.L.C.

(57) ABSTRACT

A method for a measuring instrument is disclosed, for separating the angular deviation of a rotational axis of an instrument body from a corresponding true rotational axis due to imperfections in at least one rolling-element bearing effectuating the rotational mounting of the instrument body into different parts corresponding to type of imperfection. The method comprises detecting rotary position of the at least one rolling-element bearing, and determining angular deviation of the rotational axis from the corresponding true rotational axis in a plurality of rotational positions of the instrument body, wherein the instrument body is rotated a plurality of successive full or partial revolutions about the rotational axis. There is also disclosed a measuring system and a measuring instrument to be used in such a measuring system.

15 Claims, 4 Drawing Sheets

METHOD FOR A MEASURING INSTRUMENT

TECHNICAL FIELD

The present invention relates to a method for a measuring instrument. In particular, the present invention relates to a method for a measuring instrument for determining angular deviation of at least one rotational axis of an instrument body from a corresponding true rotational axis related to any surface irregularities in at least one bearing lane of at least one rolling-element bearing and angular deviation of the at least one rotational axis from a corresponding true axis related to any difference in size of rolling elements of the at least one rolling-element bearing relatively to each other.

BACKGROUND

The art of surveying involves the determination of unknown positions, surfaces or volumes of objects or setting out of known coordinates using angle and distance measurements taken from one or more positions. In order to perform these measurements, frequently a surveying device is used comprising a distance measuring instrument with an integrated distance and angular measurement of the type commonly referred to as a total station or theodolite, i.e. comprising a combination of electronics and optics. A total station is furthermore provided with a computer or processing or control unit with writable information for measurements to be performed and for storing data obtained during the measurements. Preferably, the total station calculates the position of a target in a fixed ground-based coordinate system. A more detailed description of such a total station can for example be found in WO 2004/057269 by the same applicant.

With reference to FIG. 1, a measuring or surveying instrument of the type referred to as a total station or theodolite generally includes a movable unit 20 including optical equipment indicated with a lens 30, for example a camera for capturing a field of view and an identified target point within the field of view. The movable unit 20 is rotatably mounted in a housing 40 in such manner that it is pivotable relatively to the housing 40 around a first axis 50 as indicated by double arrow 60. The first axis 50 may also be referred to as the trunnion axis. The housing 40 is rotatably mounted in a base 80 such that the housing 40 is rotatable relatively to the base 80 around a second axis 90 as indicated by double arrow 100. The housing may also be referred to as the alidade portion 40. Thus, by rotating the movable unit 20 around the two axes 50 and 90 the movable unit 40 can be oriented in any desired position for the purpose of carrying out an intended surveying operation. When performing distance measuring or surveying tasks using a distance measuring total station, for example at a work site, a naval work site, a construction work site or a mining work site, a high degree of accuracy is generally required, with acceptable tolerances normally being in the order of arc-seconds for angles and millimeters for distance. The trunnion axis 50 is in an ideal case perpendicular to the second axis 90. Furthermore, the second axis 90 is in an ideal case vertical.

It is desirable that the rotatable mounting of the movable unit 20 and the housing 40 in the housing 40 and the base 80, respectively, comprises an accurate bearing in order to facilitate achieving a high degree of accuracy in measurements such as distance measuring or surveying tasks as described above. For example for the rotation of the housing 40 relatively to the base 80 such a bearing may comprise a V-bearing, i.e. a friction bearing having two defined contact points.

Other examples of bearings are rolling-element bearings, i.e. bearings carrying a load by means of round elements located between two parts of the bearing. An example of rolling-element bearings is radial ball bearings, i.e. bearings having inner and outer races, or lanes, and a set of balls configured in a row which revolves around the ball path. The radial ball bearing may be stressed, or preloaded, radially and/or axially. Each race is a ring with a groove where the balls rest. The groove is usually shaped so that each ball has a slightly loose fit in the groove. Thus, in principle each ball contacts each race at a single point.

However, in high-accuracy applications such as described above rolling-element bearings in general give rise to errors in measurements of distances and/or angles due to imperfections in the rolling-element bearings, i.e. deviations in the geometrical configuration of the rolling-element bearing from the ideal case, which imperfections may give rise to deviation of the first 50 and/or second axis 90 from the respective 'true' (reference) axis.

SUMMARY

It is with respect to the above considerations and others that the present invention has been made. The present invention seeks to mitigate, alleviate or eliminate one or more of the above-mentioned deficiencies and disadvantages singly or in combination. In particular, it would be desirable to achieve a method for determining angular deviation of at least one rotational axis of an instrument body of a measuring instrument from a corresponding true rotational axis due to imperfections in a bearing of rolling-element bearing type that effectuates the rotatable mounting of the instrument body.

To achieve this, a method and a system having the features as defined in the independent claims are provided. Further advantageous embodiments of the present invention are defined in the dependent claims.

With reference to radial ball bearings as way of example, bearing errors or imperfections which have to be taken into account will be discussed in the following. Firstly, the inner and outer rings may have surface irregularities, e.g. portions of the inner and/or outer rings having a surface roughness exceeding a predetermined tolerance. Secondly, the balls may not roll in an ideal manner due to one or several balls in the radial ball bearing having a slightly larger (or smaller) diameter than the nominal diameter (i.e. the size of one or more of the balls being different relatively to other balls in the radial ball bearing).

As mentioned above, such bearing errors or imperfections are generally required to be taken into account in high-accuracy distance measuring or surveying applications. Acceptable tolerances are normally in the order of arc-seconds for angles and millimeters for distance. Further, in dynamic applications such as scanning and two face measurements it can also be of importance to take into account such errors or imperfections.

As discussed in the foregoing, several sources of error (i.e. imperfections) make the performance of a radial ball bearing deviate from the performance of an 'ideal' radial ball bearing. These imperfections may give rise to deviation of the first 50 and/or second axis 90 from the respective 'true' (reference) axis, or ideal axis (cf. FIG. 1). This may, in turn, give rise to errors in measurements of distances and/or angles as already discussed in the foregoing. If these deviations were known, they could be compensated for and thus the accuracy of measurements of distances and/or angles could be maintained on a high level.

However, compensation of such errors is difficult. This is due to the fact that a given point on the inner or outer ring of the radial ball bearing rotates with a speed that is different from the speed of rotation of the balls in the radial ball bearing. Firstly, deviation of the rotational axis around which the radial ball bearing rotates from the 'true' rotational axis caused by surface irregularities in the bearing lane of the inner and/or outer ring is periodic with $2\pi$ rad (i.e. the outer or the inner ring of the radial ball bearing, or a point on the outer or the inner ring of the radial ball bearing undergoing a complete revolution). Secondly, deviation of the rotational axis around which the radial ball bearing rotates from the 'true' rotational axis caused by one or several balls in the radial ball bearing having a slightly larger (or smaller) diameter than the nominal diameter is not periodic with $2\pi$ rad. Rather, the balls orbit in the ball path with a period that in general is not equal to the period of rotation of the inner or outer ring of the radial ball bearing. Typically, the balls of a radial ball bearing complete a single orbit in the ball path during the same time it takes for the inner or outer ring of the radial ball bearing to rotate about $5\pi$ rad (or about 2.5 revolutions around the axis of rotation).

The present invention is based on separation of the angular deviation of a rotational axis of an instrument body from a corresponding true rotational axis due to imperfections in rolling-element bearing(s) effectuating the rotational mounting of the instrument body into different parts corresponding to type of imperfection. Namely, a first part corresponding to angular deviation of the rotational axis from a corresponding true rotational axis related to any surface irregularities in at least one bearing lane of the rolling-element bearing(s), and a second part corresponding to angular deviation of the at least one rotational axis from a corresponding true axis related to any difference in size of rolling elements of the rolling-element bearing(s) relatively to each other.

Such a separation is achieved by means of keeping track of the rotary position of the rolling-element bearing and a calibration routine for rotation around the rotational axis/axes. This enables to later compensate for any errors in measurements of distances and/or angles due to imperfections in the rolling-element bearings. In turn, this may enable achieving a higher accuracy in measurements of distances and/or angles.

For the rotational axis 90 (cf. FIG. 1), the calibration routine can for example comprise collecting tilt sensor readings (i.e. angular deviation values of the rotational axis 90 from a corresponding true rotational axis) from several rotational positions during several full or partial revolutions of the instrument body around the axis 90, and compare readings associated with respective revolutions. In the calibration routine it is taken into account that angular deviation of the rotational axis 90 from a corresponding true rotational axis related to any surface irregularities in at least one bearing lane of the rolling-element bearing(s) is periodic with a rotation of $2\pi$ rad of the instrument body. Further, it is taken into account that angular deviation of the at least one rotational axis from a corresponding true axis related to any difference in size of rolling elements of the rolling-element bearing(s) relatively to each other is not periodic with a rotation of $2\pi$ rad of the instrument body.

For the rotational axis 50 (cf. FIG. 1), the calibration routine can be performed similarly as for the rotational axis 90, but instead of using a tilt sensor or the like, repeated positioning to a stable target by means of for example an autocollimator or tracker is utilized.

According to a first aspect of the present invention, there is provided a method for a measuring instrument. The measuring instrument comprises at least one rolling-element bearing, comprising a plurality of rolling elements and a first and a second bearing lane, and an instrument body controllably rotatable about at least one rotational axis by means of the at least one rolling-element bearing. The method determines angular deviation of the at least one rotational axis from a corresponding true rotational axis due to bearing imperfections. The method comprises detecting the rotary position of the at least one rolling-element bearing. Angular deviation of the at least one rotational axis from a corresponding true rotational axis in a plurality of rotational positions of the instrument body is determined, wherein the instrument body is rotated a plurality of successive full or partial revolutions about the at least one rotational axis such that a plurality of sets of angular deviation values are generated. Each set of angular deviation values corresponds to a respective revolution. Angular deviation of the at least one rotational axis from a corresponding true rotational axis related to any surface irregularities in at least one bearing lane of the at least one rolling-element bearing and angular deviation of the at least one rotational axis from a corresponding true axis related to any difference in size of rolling elements of the at least one rolling-element bearing relatively to each other is determined. The determination is performed on basis of the rotary position of the at least one rolling-element bearing and comparison between at least two sets of angular deviation values of the plurality of sets of angular deviation values.

Thus, by such a method the angular deviation of the at least one rotational axis from a corresponding true rotational axis due to imperfections in the at least one rolling-element bearing can be separated into different parts corresponding to type of imperfection. This is achieved by means of keeping track of the rotary position of the at least one rolling-element bearing and a calibration routine for rotation around the rotational axis/axes as described above, wherein the instrument body is rotated a plurality of successive full or partial revolutions about the at least one rotational axis. This enables to later compensate for any errors in measurements of distances and/or angles arising due to imperfections in the at least one rolling-element bearing. In turn, this may enable achieving a higher accuracy in measurements of distances and/or angles.

The method may for example be performed prior to a session of measurements with the measuring instrument is to be carried out. The angular deviations as determined by the method may then be utilized in order to compensate for errors in measurements of distances and/or angles arising due to imperfections in the at least one rolling-element bearing. After the measuring instrument has been used during a predetermined period of time, the method may be performed again in order to ascertain a high accuracy in measurements of distances and/or angles during relatively long periods of use of the measuring instrument.

According to a second aspect of the present invention, there is provided a measuring system comprising a measuring instrument, an angular deviation determining module and a processing module.

The measuring instrument of the measuring system comprises at least one rolling-element bearing, comprising a plurality of rolling elements and a first and a second bearing lane. The measuring instrument comprises an instrument body controllably rotatable about at least one rotational axis by means of the at least one rolling-element bearing and a rolling-element bearing rotary position detecting element.

The angular deviation determining module of the measuring system is configured to determine angular deviation of the at least one rotational axis from a corresponding true rotational axis in a plurality of rotational positions of the instrument body, wherein the instrument body is rotated a plurality of successive full or partial revolutions about the at least one rotational axis such that a plurality of sets of angular deviation values are generated. Each set of angular deviation values corresponds to a respective revolution.

The processing module of the measuring system is configured to determine angular deviation of the at least one rotational axis from a corresponding true rotational axis related to any surface irregularities in at least one bearing lane of the at least one rolling-element bearing and angular deviation of the at least one rotational axis from a corresponding true axis related to any difference in size of rolling elements of the at least one rolling-element bearing relatively to each other. The determination is performed on basis of the rotary position of the at least one rolling-element bearing and comparison between at least two sets of angular deviation values of the plurality of sets of angular deviation values.

According to a third aspect of the present invention there is provided a measuring instrument configured to be used in a measuring system according to the second aspect of the present invention or embodiments thereof.

The rotary position of the at least one rolling-element bearing may be detected by sensing the position of at least one member of the at least one rolling-element bearing, where the at least one member of the at least one rolling-element bearing is moveable in relation to the bearing lanes of the at least one rolling-element bearing.

The sensing may be performed by a dedicated detection device. The detection device can for example be comprised in the rolling-element bearing rotary position detecting element.

The position of the at least one member may be sensed at a plurality of detection sites arranged in a spaced succession in proximity of the at least one rolling-element bearing. For example, the rolling-element bearing rotary position detecting element may comprise a plurality of detection devices arranged in a spaced succession in proximity of the at least one rolling-element bearing. Such a configuration may increase the accuracy in detecting the rotary position of the at least one rolling-element bearing.

The sensing as discussed in the foregoing may be performed by means of optical or magnetic means, as further described in the following.

In an exemplifying magnetic rotary position sensor, a magnet is attached to a rotating member of the rolling-element bearing, or the rotating member of the rolling-element bearing is magnetic itself, and a magnetic field of the magnet is applied to a magnetoelectric transducer. The magnetoelectric transducer detects the magnetic field of the magnet which changes in accordance with the rotation of the magnet, and the sensor outputs an electrical signal representing the rotation angle of the rotating member.

The at least one member may for example comprise one of a rolling element and/or at least a portion of a carrier, or cage, for holding the rolling elements.

The at least one detection device may comprise a Hall effect sensor, wherein the at least one member of the at least one rolling-element bearing is magnetic.

Alternatively or optionally, the at least one detection device may comprise a magnetoresistive sensor, wherein the at least one member of the at least one rolling-element bearing is magnetic.

Alternatively or optionally, the at least one detection device may comprise an optical sensor comprising at least one light receptor and at least one light emitter adapted to cooperate with corresponding ones of at least one marking element arranged on or constituted by the at least one member.

Thus, the detection device can be appropriately chosen depending on capacity, design and/or user requirements.

In the context of some embodiments of the present invention, by the instrument body being controllably rotatable about at least one rotational axis it is referred to the instrument body being controllably rotatable about at least one rotational axis in relation to at least one other component of the measuring instrument.

In the context of some embodiments of the present invention, by the wording 'total station' used herein it is referred to a distance measuring instrument with an integrated distance and angular measurement, i.e. with combined electronic, optical and computer techniques. Such an instrument gives both the distance as well as the vertical and horizontal direction towards a target, whereby the distance is measured against an object or target such as a reflector.

In the context of some embodiments of the present invention, the wording 'total station' used herein includes the following: survey unit, measuring instrument, surveying instrument or geodetic instrument.

The steps of any method disclosed herein do not have to be performed in the exact order disclosed, unless explicitly stated.

The present invention relates to all possible combinations of features recited in the claims.

Further objects and advantages of the various embodiments of the present invention will be described below by means of exemplifying embodiments.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the invention are shown. The present invention may however be embodied in many different forms and should not be construed as limited to the embodiments set forth herein, these embodiments are rather provided by way of example so that this disclosure will convey the scope of the invention to those skilled in the art. Furthermore, like numbers refer to like or similar elements throughout.

The present invention will hereinafter be described in connection with a measuring instrument, such as a three dimensional scanning device, a total station or a geodetic instrument. A total station is a distance measuring instrument with an integrated distance and angular measurement, i.e. with combined electronic, optical and computer techniques. Such a total station can produce both the distance as well as the vertical and horizontal direction towards an object or a target, whereby the distance is measured against a reflecting surface or a reflector, e.g. of the corner cube type. A total station is furthermore provided with a computer or control unit with writable information for measurements to be performed and for storing data obtained during the measurements. Preferably, the total station calculates the position of a target in a fixed ground-based coordinate system. In, for example, WO 2004/057269 by the same applicant, such a total station is described in more detail. A three dimensional scanning device is a distance measuring instrument with an integrated distance and angular measurement, i.e. with combined electronic, optical and computer techniques dedicated to perform the measurements and subsequent data processing in a quick and time-efficient manner.

In general, a measuring instrument or total station includes a control unit, including a control logic, and a position calculation circuit including arrangements for sending out measuring beams for distance and alignment measurements and sensor arrangements for receiving reflected beams from target of an object or an individual target. The position calculation circuit comprises an angle measuring system adapted to measure a horizontal angle to the target and a vertical angle to the target. Further, the position calculation circuit comprises a distance measuring system adapted to measure the distance to the target and a tracker/servo system adapted to control the movement of the total station and to aim at the target.

Figure 1:
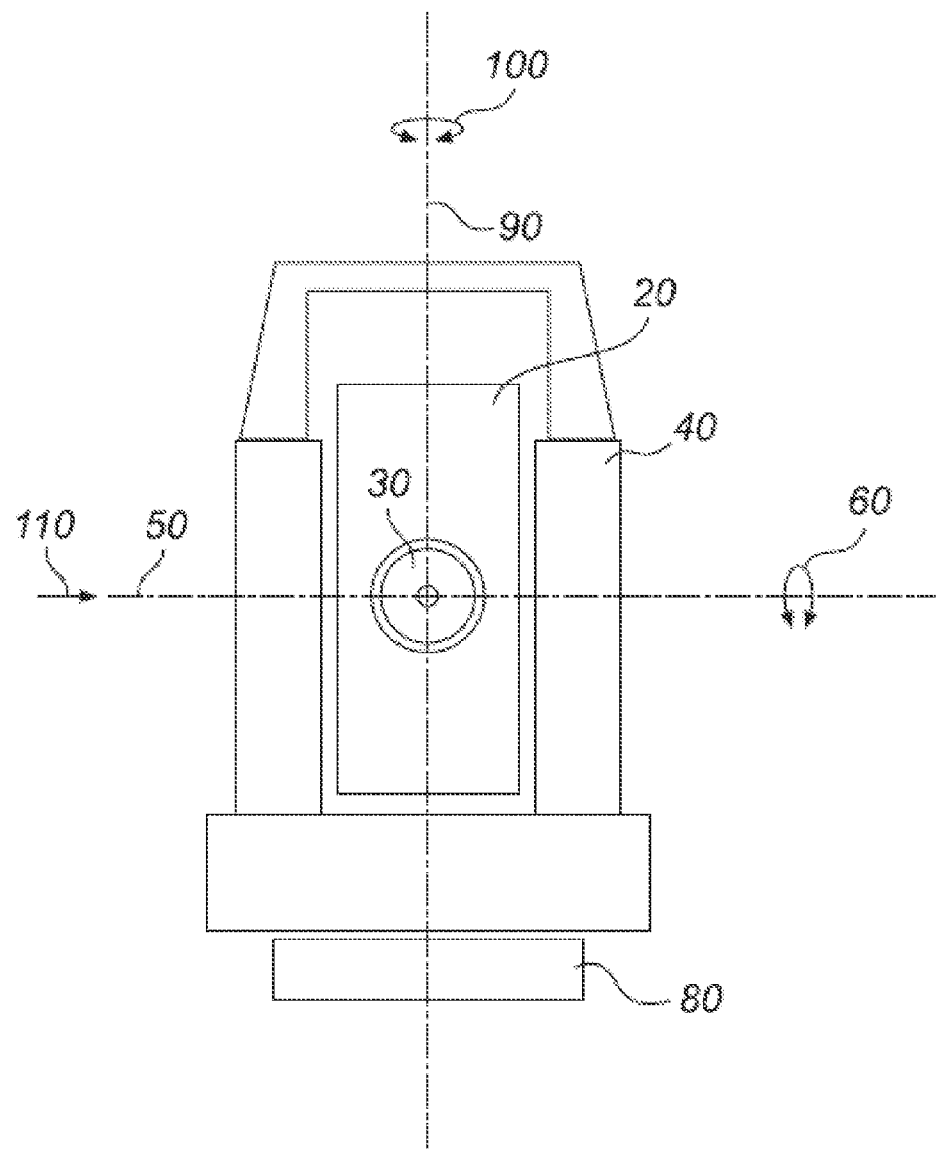
FIG. 1 is a schematic view of a total station.
Figure 2:
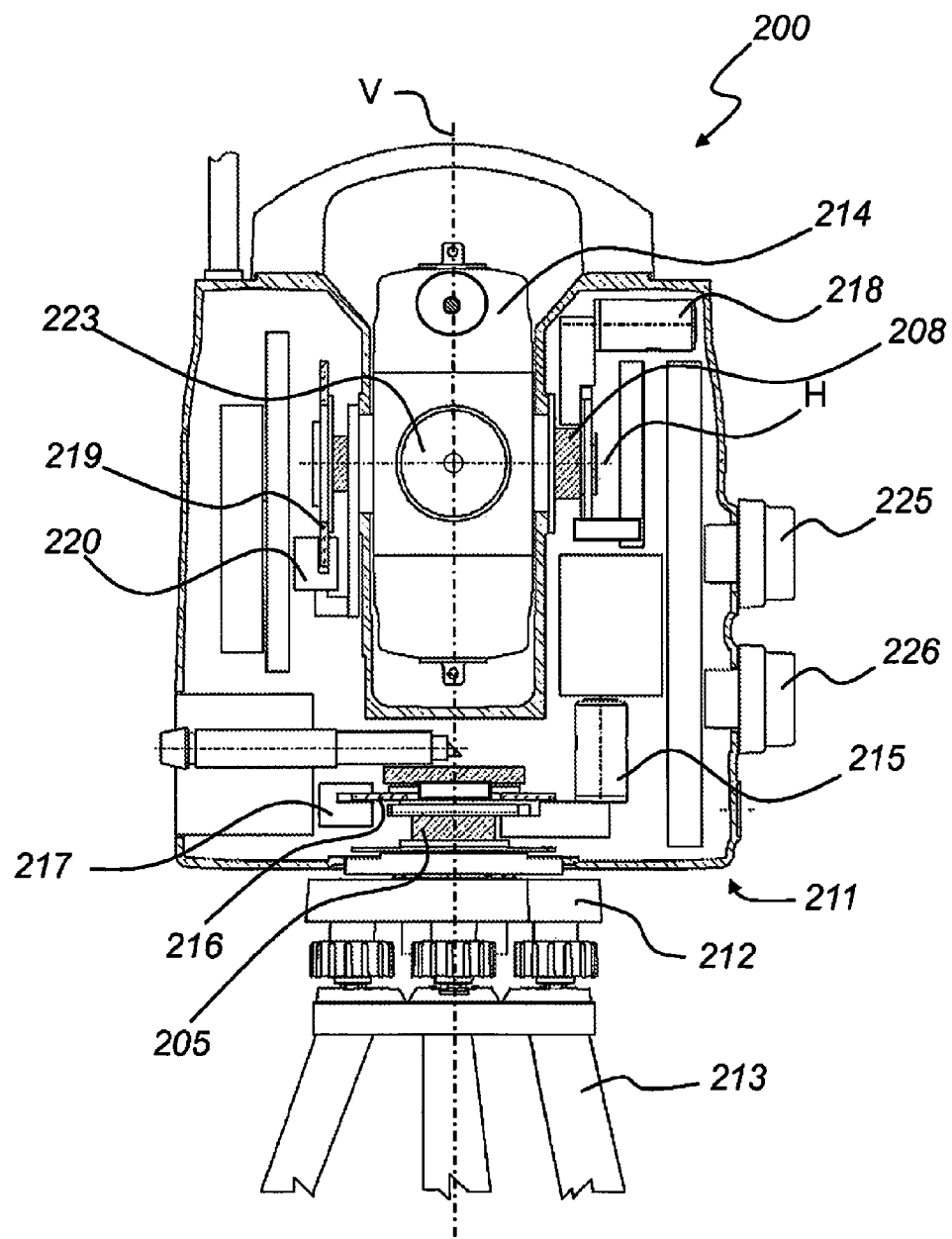
FIG. 2 is a schematic cross sectional view of a total station according to an exemplifying embodiment of the present invention.

Referring now to FIG. 2, there is shown a schematic illustration of a total station 200 according to an exemplifying embodiment of the present invention. The total station 200 shown in FIG. 2 comprises an instrument body or alidade 211 mounted on a base 212, and has a mounting support structure in the form of a tripod 213. The alidade 211 can be rotated about a vertically oriented rotation axis V by means of a rolling-element bearing 205, in order to aim the instrument in any desired horizontal direction. The rolling-element bearing 205 may for example comprise a radial ball bearing. In the alidade 211, there is arranged another instrument body, or center unit 214 or telescope unit, which can be rotated about a horizontally oriented rotation axis H by means a rolling-element bearing 208, in order to aim the instrument in any desired vertical direction. The rolling-element bearing 208 may for example comprise a radial ball bearing. Measurements made using the total station 200 are typically related to an origin of coordinates located at the intersection between the vertically oriented and the horizontally oriented rotation axes V and H.

For rotation of the alidade about the vertically oriented rotation axis to aim the instrument in any desired horizontal direction, there is provided drive means 215. The rotational position of the alidade 211 is tracked by means of a graduated disc 216 and a corresponding angle encoder or sensor 217. For rotation of the center unit 214 about the horizontally oriented rotation axis, there are provided similar drive means 218, graduated disc 219 and sensor 220. As mentioned above, the instrument line of sight is centered at the intersection between the vertical and the horizontal rotation axes, and this can be seen in FIG. 2 where these axes cross in the center of a telescope 223 in the center unit 214.

For control or operation of the total station 200, the total station 200 is provided with a control panel (not shown in FIG. 2) and operating elements 225, 226 in the form of angle encoders arranged on the alidade 211 being operable by corresponding knobs. A device-control unit (not shown in FIG. 2) is arranged in the alidade 211 for controlling operation of the total station and is supplied with power by a power supply unit (not shown in FIG. 2). The control panel serves for communication between the operator and the total station 200.

The operating elements 225, 226 are connected to the device-control unit via corresponding interface (not shown in FIG. 2). This interface allows generation of signals corresponding to a rotary position of the operating elements 225 and 226, respectively, which are transmitted to the device-control unit.

The operating elements 225 and 226 serve for controlling rotation of the alidade 211 about the vertical axis V and tilting of the center unit 214 about the tilting axis H, respectively. In response to signals from the operating elements 225 and 226, respectively, and the interface, the device-control unit may control the drive means 215 and 218 to rotate the alidade 211 about the vertical axis V and the tilting axis V, respectively. Angle measurements may be used to control the drive means 215 and 218.

The drive means 215 and 218 is not necessarily controlled solely by the operating elements 225 and 226. respectively, but may also be controlled on the basis of a program comprising machine instructions stored and executed in the device-control unit or on the basis of commands sent to the device-control unit.

The drive means 215 and 218 cooperate with the angle-measuring device, i.e. the graduated disc 216 for the horizontal angle and the corresponding angle encoder or sensor 217, or the graduated disc 219 for the vertical angle and the corresponding sensor 220, respectively, such that the alidade 211 with the center unit 214 can be rotated as desired about the vertical axis V and the center unit 214 can be rotated about the horizontal axis H in a measurable manner and can be brought in to a desired horizontal and vertical angle position. This purpose is served inter alia by the device-control unit which receives signals from the sensors 217 and 220. In response to these signals the horizontal drive means 215 and the vertical drive means 218 can be controlled.

As can be seen in FIG. 2 the total station 200 comprises additional components not described in the foregoing. However, as important as these components may be in some applications they are not essential to the present invention and therefore are not described herein.

Figure 3:
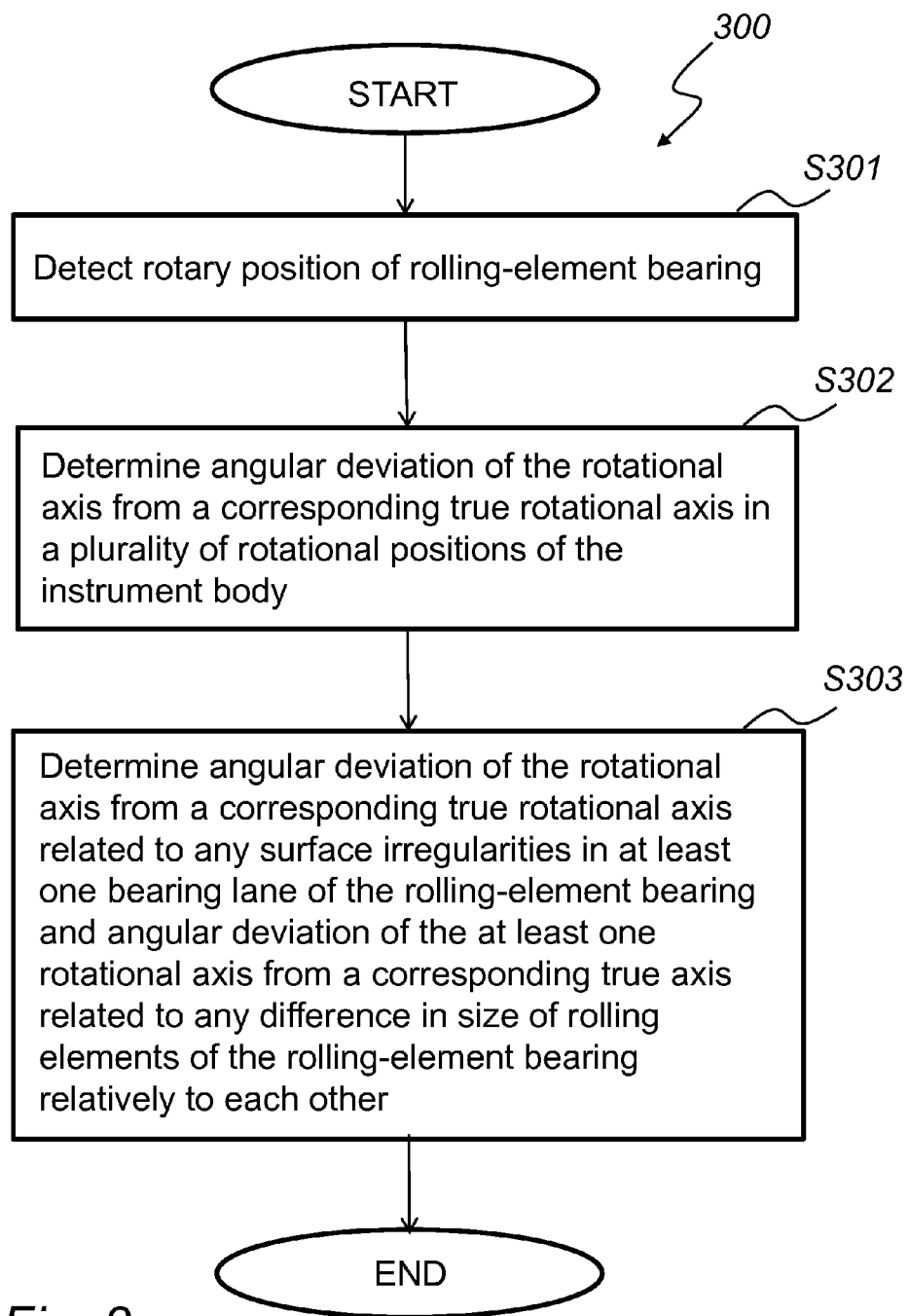
FIG. 3 is a schematic flow chart of a method according to an exemplifying embodiment of the present invention.

Referring now to FIG. 3, there is shown a schematic flow chart of a method 300 according to an exemplifying embodiment of the present invention. The method 300 is now described with reference to FIGS. 2 and 3.

The method 300 is intended for a measuring instrument such as a total station described with reference to FIG. 2. The measuring instrument 200 comprises at least one rolling-element bearing 205, 208, comprising a plurality of rolling elements and a first and a second bearing lane, and an instrument body 211, 214 controllably rotatable about at least one rotational axis V, H by means of the at least one rolling-element bearing 205, 208. The method 300 determines angular deviation of the rotational axis 205, 208 from a corresponding true rotational axis due to bearing imperfections.

At step S301, the rotary position of the rolling-element bearing 205, 208 is detected.

At step S302, angular deviation of the rotational axis V, H from a corresponding true rotational axis in a plurality of rotational positions of the instrument body 211, 214 is determined. The instrument body 211, 214 is rotated a plurality of successive full or partial revolutions about the rotational axis V, H such that a plurality of sets of angular deviation values, each set of angular deviation values corresponding to a respective revolution, are generated.

At step S303, angular deviation of the rotational axis V, H from a corresponding true rotational axis related to any surface irregularities in at least one bearing lane of the rolling-element bearing 205, 208 and angular deviation of the at least one rotational axis from a corresponding true axis related to any difference in size of rolling elements of the rolling-element bearing 205, 208 relatively to each other are determined. The determination is performed on basis of the rotary position of the rolling-element bearing 205, 208 and comparison between at least two sets of angular deviation values of the plurality of sets of angular deviation values generated in step S302.

Figure 4:
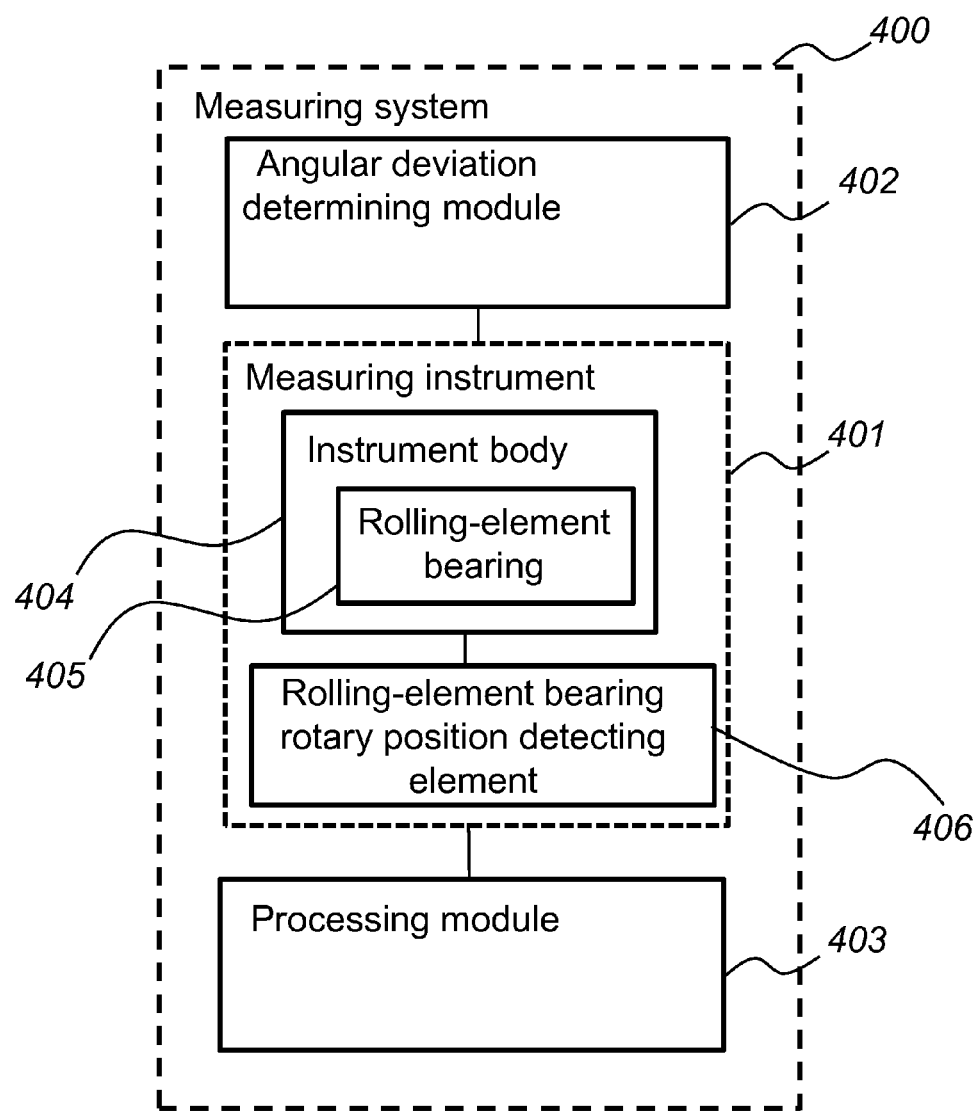
FIG. 4 is a schematic block diagram of a measuring system according to an exemplifying embodiment of the present invention.

Referring now to FIG. 4, there is shown a schematic block diagram of a measuring system 400 according to an exemplifying embodiment of the present invention. The measuring system 400 comprises a measuring instrument 401, an angular deviation determining module 402 and a processing module 403.

The measuring instrument 401 comprises at least one rolling-element bearing 405. The at least one rolling-element bearing comprises a plurality of rolling elements and a first and a second bearing lane (not shown in FIG. 4). The measuring instrument 401 comprises an instrument body 404 controllably rotatable about at least one rotational axis by means of the at least one rolling-element bearing 405 and a rolling-element bearing rotary position detecting element 406.

The angular deviation determining module 402 is configured to determine angular deviation of the at least one rotational axis from a corresponding true rotational axis in a plurality of rotational positions of the instrument body 404, wherein the instrument body 404 is rotated a plurality of successive full or partial revolutions about the at least one rotational axis such that a plurality of sets of angular deviation values are generated. Each set of angular deviation values corresponds to a respective revolution.

The processing module 403 is configured to determine angular deviation of the at least one rotational axis from a corresponding true rotational axis related to any surface irregularities in at least one bearing lane of the at least one rolling-element bearing 405 and angular deviation of the at least one rotational axis from a corresponding true axis related to any difference in size of rolling elements of the at least one rolling-element bearing 405 relatively to each other. The determination is performed on basis of the rotary position of the at least one rolling-element bearing 405 and comparison between at least two sets of angular deviation values of the plurality of sets of angular deviation values.

The processing module 403 can be positionally arranged at other locations. The processing module 403 can for example be arranged integral with the measuring instrument 401.

The angular deviation determining module 402 can for example comprise a tilt sensor and/or a stable reference target combined with an autocollimator or tracker.

Although embodiments of the present invention have been described herein mainly with reference to radial ball bearings, the present invention can be applied to measuring instruments wherein the rotatable mounting of instrument bodies are effectuated by means of other types of rolling-element bearings, such as angular contact ball bearings, cylindrical roller bearing, tapered roller bearings, thrust ball bearings, needle roller bearings, etc.

In conclusion, a method for a measuring instrument is disclosed, for separating the angular deviation of a rotational axis of an instrument body from a corresponding true rotational axis due to imperfections in at least one rolling-element bearing effectuating the rotational mounting of the instrument body into different parts corresponding to type of imperfection. The method comprises detecting rotary position of the at least one rolling-element bearing, and determining angular deviation of the rotational axis from the corresponding true rotational axis in a plurality of rotational positions of the instrument body, wherein the instrument body is rotated a plurality of successive full or partial revolutions about the rotational axis. There is also disclosed a measuring system and a measuring instrument to be used in such a measuring system.

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims. Any reference signs in the claims should not be construed as limiting the scope.

The invention claimed is:

1. A method for a measuring instrument, the measuring instrument comprising at least one rolling-element bearing, comprising a plurality of rolling elements and a first and a second bearing lane, and an instrument body controllably rotatable about at least one rotational axis by at least one rolling-element bearing, for determining angular deviation of the at least one rotational axis from a corresponding true rotational axis due to bearing imperfections, the method comprising:
   detecting the rotary position of the at least one rolling-element bearing;
   determining angular deviation of the at least one rotational axis from a corresponding true rotational axis in a plurality of rotational positions of the instrument body, wherein the instrument body is rotated a plurality of successive full or partial revolutions about the at least one rotational axis such that a plurality of sets of angular deviation values, each set of angular deviation values corresponding to a respective revolution, are generated; and
   on basis of the rotary position of the at least one rolling-element bearing and comparison between at least two sets of angular deviation values of the plurality of sets of angular deviation values, determining angular deviation of the at least one rotational axis from a corresponding true rotational axis related to any surface irregularities in at least one bearing lane of the at least one rolling-element bearing and angular deviation of the at least one rotational axis from a corresponding true axis related to any difference in size of rolling elements of the at least one rolling-element bearing relatively to each other.

2. A method according to claim 1, wherein the rotary position of the at least one rolling-element bearing is detected by sensing the position of at least one member of the at least one rolling-element bearing, said at least one member of the at least one rolling-element bearing being moveable in relation to the bearing lanes of the at least one rolling-element bearing.

3. A method according to claim 2, wherein the position of the at least one member is sensed at a plurality of detection sites arranged in a spaced succession in proximity of the at least one rolling-element bearing.

4. A method according to claim 3, wherein the at least one member comprises one of:
   a rolling element; and/or
   at least a portion of a carrier for holding the rolling elements.

5. A method according to claim 2, wherein the sensing is performed by an optical or magnetic device.

6. A method according to claim 5, wherein the at least one member comprises one of:
   a rolling element; and/or at least a portion of a carrier for holding the rolling elements.

7. A method according to claim 2, wherein the at least one member comprises one of:
a rolling element; and/or
at least a portion of a carrier for holding the rolling elements.

8. A measuring system comprising:
a measuring instrument comprising:
at least one rolling-element bearing, comprising a plurality of rolling elements and a first and a second bearing lane;
an instrument body controllably rotatable about at least one rotational axis by the at least one rolling-element bearing; and
a rolling-element bearing rotary position detecting element;
the measuring system further comprising:
an angular deviation determining module configured to determine angular deviation of the at least one rotational axis from a corresponding true rotational axis in a plurality of rotational positions of the instrument body, wherein the instrument body is rotated a plurality of successive full or partial revolutions about the at least one rotational axis such that a plurality of sets of angular deviation values, each set of angular deviation values corresponding to a respective revolution, are generated; and
a processing module configured to, on basis of the rotary position of the at least one rolling-element bearing and comparison between at least two sets of angular deviation values of the plurality of sets of angular deviation values, determine angular deviation of the at least one rotational axis from a corresponding true rotational axis related to any surface irregularities in at least one bearing lane of the at least one rolling-element bearing and angular deviation of the at least one rotational axis from a corresponding true axis related to any difference in size of rolling elements of the at least one rolling-element bearing relatively to each other.

9. A measuring system according to claim 8, wherein the rolling-element bearing rotary position detecting element comprises at least one detection device adapted to sense at least one member of the at least one rolling-element bearing, said at least one member of the at least one rolling-element bearing being moveable in relation to the bearing lanes of the at least one rolling-element bearing.

10. A measuring system according to claim 9, wherein the at least one detection device comprises one of:
a Hall effect sensor, wherein the at least one member of the at least one rolling-element bearing is magnetic;
a magneto-resistive sensor, wherein the at least one member of the at least one rolling-element bearing is magnetic; and
an optical sensor comprising at least one light receptor and at least one light emitter adapted to cooperate with corresponding ones of at least one marking element arranged on or constituted by the at least one member.

11. A measuring system according to claim 10, wherein the at least one member comprises one of:
a rolling element; and/or
at least a portion of a carrier for holding the rolling elements.

12. A measuring system according to claim 9, wherein the rolling-element bearing rotary position detecting element comprises a plurality of detection devices arranged in a spaced succession in proximity of the at least one rolling-element bearing.

13. A measuring system according to claim 12, wherein the at least one member comprises one of:
a rolling element; and/or
at least a portion of a carrier for holding the rolling elements.

14. A measuring system according to claim 9, wherein the at least one member comprises one of:
a rolling element; and/or
at least a portion of a carrier for holding the rolling elements.

15. A measuring instrument configured to be used in a measuring system according to claim 8.

* * * * *